United States Patent Office 3,849,518
Patented Nov. 19, 1974

3,849,518
PROCESS FOR PREPARING IMPACT-RESISTANT POLYMERIC COMPOSITIONS CONTAINING GRAFT COPOLYMERS
Febo Severini, Alberto Valvassori, and Carlo Tavazzani, Milan, and Alberto Pagliari, Saronno, Italy, assignors to Montecatini Edison S.p.A., Foro Buonaparte, Milan, Italy
No Drawing. Filed Dec. 18, 1972, Ser. No. 315,879
Claims priority, application Italy, Dec. 24, 1971, 32,893/71
Int. Cl. C08f 15/00
U.S. Cl. 260—878 R    3 Claims

ABSTRACT OF THE DISCLOSURE

Impact-resistant polymeric compositions are prepared by graft polymerizing at least one ethylenically unsaturated monomer onto an elastomer dissolved in propane, n-butane or a mixture thereof.

CROSS REFERENCE TO RELATED APPLICATIONS

None.

BACKGROUND OF THE INVENTION

1. Field of the Invention

The invention relates to processes for preparing impact-resistant compositions. More particularly, the invention relates to processes for obtaining polymeric compositions containing a graft copolymer derived from the polymerization of one or more vinyl or acrylic monomers in the presence of an elastomeric rubber consisting of a saturated olefinic copolymer or an olefinic copolymer of low unsaturation.

2. The Prior Art

It is known that by polymerizing vinyl monomers in the presence of elastomeric materials, such as rubbers, it is possible to obtain crude graft products consisting of (1) a graft copolymer formed by the reaction between the elastomer and the vinyl monomers; (2) unreacted elastomer, i.e., elastomer which has not participated in the grafting reaction and (3) varying amounts of non-grafted polymer derived from the vinyl monomer or monomers.

The graft copolymer (1) ensures the compatibility of the non-grafted (unreacted) elastomer with the resinous matrix derived from the monomers which were subjected to polymerization and, if such matrix is brittle, it generally improves the impact strength thereof.

The grafting reaction is generally carried out by using an aqueous dispersion of the elastomer or a solution thereof in an organic solvent or in a mixture of solvents according to the well known technique of solution polymerization.

At the conclusion of the reaction, it is necessary to separate the crude reaction products from the suspending medium by coagulating the final mixture, and then to wash the thusly separated solids.

According to the solution polymerization technique, the prior art teaches the use, as a solvent for the elastomer, of mixtures of aromatic hydrocarbons with aliphatic hydrocarbons having at least five carbon atoms. The prior art also recommended the use, alone, of aromatic hydrocarbons or aliphatic hydrocarbons having at least five carbon atoms, or mixtures of such aliphatic hydrocarbons.

SUMMARY OF THE INVENTION

According to the present invention, it has now been surprisingly found that by graft polymerizing according to the well known solution polymerization technique in the presence of a solvent or swelling agent for the elastomer selected from the group consisting of n-butane, propane and mixtures thereof, there are obtained crude grafts, the impact strength of which is much higher than that of the same crude grafts prepared under the same conditions, but in the presence of a solvent consisting of one or more aliphatic hydrocarbons having at least five carbon atoms, such as n-hexane or petroleum ether.

Good results are also obtained if the hydrocarbon solvent employed in the present process, i.e., n-butane, propane or mixtures thereof, also contains isobutane or small amounts of butenes or butadiene.

According to the known technique, the graft polymerization reaction may be conducted in a stainless steel autoclave provided with an anchor-shaped stirrer, and means for introducing the monomers and the polymerization initiator under pressure. The autoclave is preferably heated by a fluid, heated to the desired reaction temperature, circulating in a jacket surrounding the reactor.

It is possible, in conducting the polymerization, to operate according to different modalities, but preferably the elastomer which is a saturated olefinic copolymer, or an olefinic copolymer of low unsaturation is introduced into the autoclave in small pieces. After flushing the air out of the system, for example, with a stream of nitrogen, the hydrocarbon which is used as the solvent is introduced into the autoclave under pressure, in the liquid state. The reaction mass is stirred at room temperature or at a temperature between room temperature and 70° C. to dissolve or swell the elastomer to be grafted.

The time required for the dissolution varies, and may range from several minutes to 8–10 hours, depending on the composition of the elastomer, the intrinsic viscosity thereof and the temperature at which the dissolution is carried out.

Once the required time has elapsed, the monomer, or the mixture of monomers to be grafted onto the elastomer, and the polymerization initiator are added to the reaction mass; the whole mass is heated to the reaction temperature and the polymerization reaction is allowed to continue until the desired degree of conversion has been attained, preferably until total conversion has been attained. Subsequently, the reaction is cooled and the hydrocarbon solvent is distilled off. The solvent may be easily recovered and then used for other purposes if desired.

Alternatively, the distillation of the solvent may be preceded by the addition of a precipitator, e.g., ethyl alcohol or isopropyl alcohol, in order to promote the separation of the crude graft in the form of a fine powder.

The crude reaction product is then easily discharged from the reactor in the form of a suspension thereof in the precipitator, if a precipitator is used, or in the form of a powder or easily pulverizable crumbs, which are rapidly dried in a vacuum oven at 40–50° C.

The elastomers which may be used in the process of the invention are saturated copolymers of ethylene and an alpha-olefin such as propylene, or copolymers of ethylene, an alpha-olefin such as propylene and one or more cyclic or acyclic, conjugated or non-conjugated dienes or polyenes. These copolymers are characterized by a low degree of unsaturation. The preferred elastomers are the substantially amorphous terpolymers of ethylene, propylene (or butene-1) and a third monomer selected from the group consisting of 1,4-pentadiene, 1,4-hexadiene, 1,5-hexadiene, 1,7,9-dodecatriene, 1,5-methylheptadiene, 5-omega-alkenyl-norbornenes-2 (wherein the alkenyl group has 1 to 4 carbon atoms), 5-alkylidene norbornenes-2 (wherein the alkylidene group has 1 to 4 carbon atoms), 2,5-norbornadiene, 2-alkylnorbornadienes-2,5 (wherein the group has 1 to 4 carbon atoms), 1,5-cyclooctadiene, dicyclopentadiene, tetrahydroindene and 5-methyl-tetrahydroindene. These terpolymers have an ethylene content of 20–80 mole percent and a diene content of 0.1–20 mole percent and a molecular weight of 50,000–800,000 preferably 70,000–500,000.

As the monomer to be grafted onto the elastomer, there may be used:

(1) Styrene and derivatives thereof substituted in the aromatic nucleus and/or in the vinyl group such as e.g. the chlorostyrenes, the methyl-styrenes and alpha-methyl-styrene;

(2) Acrylic monomers, such as acrylonitrile, methacrylonitrile, alkyl acrylates and alkyl methacrylates (wherein the group has 1 to 4 carbon atoms); and (3) Vinyl monomers not included in the preceding classes, such as vinyl chloride and vinyl acetate.

The above monomers may be used either alone or as mixtures thereof.

Organic peroxides such as acetyl peroxide, lauroyl peroxide, t.-butyl perpivalate or thermolabile azo-derivatives, such as azobisisobutyronitrile, etc. can be used as the polymerization initiator.

Both the polymerization initiator and the monomer may be added to the reaction mass all at once or in several portions during the course of the reaction.

The amount of polymerization initiator employed, calculated in relation to the total reacting mass varies from 0.1 to 10% by weight and is preferably between 0.2 and 5%.

The polymerization may be conducted in the presence of varying amounts of molecular weight modifiers, such as dodecyl mercaptan or substances having a similar effect.

The crude product obtained as a result of the graft polymerization may contain quantities of elastomers ranging from 10 to 70% by weight. Compositions containing as little as 10% of elastomer have very high impact strength values.

The materials obtained according to the process of this invention are easily processable in conventional processing machines and are mixable with other polymeric materials such as styrene-acrylonitrile copolymers or polyvinylchloride, leading to compositions which, upon molding, yield materials having excellent properties, the mechanical characteristics of which vary depending upon the elastomer content thereof.

DESCRIPTION OF THE PREFERRED EMBODIMENTS

The following examples are given to illustrate preferred embodiments of the invention without limiting it.

EXAMPLE 1

A stainless steel reactor having a 2 liter capacity and provided with a stirrer, is charged with 50 g. of an ethylene/propylene/5-ethylidene-norbornene-2 (ENB) terpolymer having the following composition by weight:

| | Percent |
|---|---|
| Ethylene | 51.5 |
| Propylene | 39 |
| ENB | 9.5 | and an intrinsic viscosity determined in cyclohexane at 30° C. of 2.75 dl/g. The reactor is sealed, and the air flushed out by repeatedly washing with nitrogen. 400 g. of 99.9% pure liquid n-butane are introduced into the reactor. The stirred mass is heated for 5 hours at 70° C., after which the reactor is fed with 285 g. of a mixture of 35 parts by weight of acrylonitrile and 65 parts by weight of styrene having 4.4 g. of 75% benzoyl peroxide dissolved therein.

The temperature is raised to 81° C. and, after 9 hours, the whole mass is cooled to 40° C. The n-butane is distilled off and the resulting polymer is discharged in the form of a pulverulent mass, which is dried in an oven at 40° C. under reduced pressure to thereby obtain 335 g. of dry material containing 15% of total rubber. A portion of the crude reaction product is homogenized on a roll mixer at a temperature of 185° C. and the product thus obtained is subsequently molded under compression at a temperature of 180° C.

The test specimens required for determining the mechanical characteristics of the product are made from the plates obtained by the above molding step.

In this and the following examples, the mechanical characteristics were determined according to the ASTM standards indicated below:

Izod impact strength at 23° C. on notched test specimens: ASTM D 256–56
Rockwell hardness: ASTM D 785–62
Ultimate tensile strength: ASTM D 638–61T
Elongation at break: ASTM D 638–58T The mechanical characteristics of the crude polymerization product are as follows:

Izod impact strength at 23° C. on notched test specimens = (the specimens partially break) = 65 kg.·cm./cm.
Rockwell hardness, scale L=69
Ultimate tensile strength=453 kg./cm.$^2$.

EXAMPLE 2

The reactor described in Example 1 is charged with 50 g. of an ethylene-propylene-ENB terpolymer elastomer having the following composition by weight:

| | Percent |
|---|---|
| Ethylene | 58.4 |
| Propylene | 38 |
| ENB | 3.6 | and an intrinsic viscosity, measured in cyclohexane at 30° C., of 2.75 dl./g. After removal of the air, 400 g. of liquid n-butane are introduced to the reactor and the dissolution is effected as in Example 1. Then, 200 g. of a mixture of 35 parts by weight of acrylonitrile and 65 parts by weight of styrene having 3.3 g. of 75% benzoyl peroxide dissolved therein are introduced into the reactor. The temperature is raised to 85° C., and after 6 hours the whole mass is cooled to 40° C. The n-butane is distilled off and the resulting polymer is discharged in the form of a pulverulent mass which is rapidly dried in an oven at 40° C., under reduced pressure. The product consists of 250 g. of dry material containing 20% of total rubber, of which 76% is not extractable with cyclohexane. Of the total amount of starting monomer which was subjected to the grafting reaction, it was ascertained by acetone extraction that 9% by weight of such monomer actually participated in the grafting reaction.

By operating as in Example 1, plates having the following mechanical characteristics are obtained by compression molding:

Izod impact strength at 23° C. on notched test specimens=37 kg.·cm./cm.
Rockwell hardness, scale R=95
Ultimate tensile strength=300 kg./cm.$^2$
Elongation at break=20%.

Comparison tests (A) Example 2 is repeated using n-hexane as the solvent. There are obtained 250 g. of a dry material containing 20% of rubber, 70% of which is not extractable with cyclohexane, while the quantity of the monomer which participated in the grafting reaction, determined on the basis of the fraction extractable with acetone, represents 6% of the monomer subjected to the grafting reaction.

By operating as in Example 1, plates having the following mechanical characteristics are obtained by compression molding:

Izod impact strength at 23° C. on notched test specimens=37 kg.·cm./cm.
Rockwell hardness, scale R=95
Ultimate tensile strength=450 kg./cm.$^2$.

(B) Example 2 is repeated using petroleum ether consisting of a mixture of hydrocarbons having a boiling point between 30 and 50° C. as the solvent. There are obtained 250 g. of dry material containing 20% of rubber, of which 43% is not extractable with cyclohexane, while the quantity of monomer which participated in the grafting reaction amounts to 4% of the monomer subjected to the grafting reaction.

By operating as in Example 1, plates having the following mechanical characteristics are obtained by compression molding:

Izod impact strength at 23° C. on notched test specimens=7 kg.·cm./cm. (total breaking of the specimens)
Rockwell hardness, scale R=86
Ultimate tensile strength=310 kg./cm.²

From these comparison tests it is clear that the impact strength of the material obtained by operating in n-butane is much higher than that of the material produced by using n-hexane or petroleum ether as the polymerization solvent.

EXAMPLE 3

The reactor described in the preceding Examples is charged with 50 g. of the elastomer of Example 1, and after removal of the air by flushing with nitrogen, 400 g. of n-butane are added. The mass, which is kept under stirring, is heated for 5 hours at 70° C., after which the reactor is charged with 93 g. of a mixture of 35% by weight of acrylonitrile and 65% by weight of styrene containing 1.9 g. of 75% benzoyl peroxide. The temperature is raised to 81° C. and after 9 hours the reaction mass is cooled to 40° C. The n-butane is distilled off and the polymer is discharged in the form of a rubber-like mass which is dried in an oven at 40° C., under reduced pressure. 143 g. of dry material containing 35% of total rubber are obtained, 80% of which is not extractable with cyclohexane.

The crude reaction product is diluted to 20% of total rubber with an acrylonitrile-styrene resin containing 25% by weight of acrylonitrile and having an intrinsic viscosity, determined in dimethyl formamide at 30° C., of 0.9 dl./g.

By operating as described in the preceding Examples, plates having the following mechanical characteristics are obtained by compression molding:

Izod impact strength at 23° C. on notched test specimens=30 kg.·cm./cm. (the specimens break partially)
Ultimate tensile strength=261 kg./cm.²
Elongation at break=11%
Rockwell hardness, scale R=96.

EXAMPLE 4

The autoclave used in the preceding Examples is charged with 30 g. of the elastomer used in Example 2 and 0.39 g. of azobisisobutyronitrile. After removing the air by flushing with nitrogen, 400 g. of n-butane and 300 g. of vinyl chloride are introduced to the autoclave. The mass is kept under stirring at a temperature of 30° C. for 5 hours, after which the whole mass is heated to 65° C. and kept at this temperature for 16 hours. Subsequently, 1 liter of isopropyl alcohol is added to the reaction mixture which has been cooled to room temperature. The n-butane and the unreacted vinyl chloride are allowed to slowly distill off, and the crude reaction product is recovered by filtration in the form of a very fine powder.

The dry material weighs 128 g. and contains 23.4% of rubber, 60% of which cannot be extracted with cyclohexane.

The crude product is diluted to a final rubber content of 9% with a polyvinyl chloride having a Fikentscher K constant of 60 and the mixture, after stabilization with Ba-Cd laurate is homogenized on a roll mixer.

The obtained sheet is compression molded and the mechanical characteristics of the obtained material are determined.

The results are as follows:

Izod impact strength at 23° C. on notched test specimens=20 kg.·cm./cm.
Rockwell hardness, scale L=60.

Variations and modifications can, of course, be made without departing from the spirit and scope of the invention.

Having thus described our invention, what we desire to secure by Letters Patent and hereby claim is:

1. A process for preparing impact-resistant polymeric compositions comprising graft polymerizing at least one ethylenically unsaturated monomer selected from the group consisting of styrenes, acrylonitrile, methacrylonitrile, styrene/acrylonitrile mixtures, alkyl acrylates, alkyl methacrylates, vinyl chloride and vinyl acetate onto an elastomer selected from the group consisting of saturated copolymers of ethylene and an α-olefin and low unsaturation copolymers of ethylene, an α-olefin and a diene or polyene hydrocarbon, wherein said elastomer is dissolved in a solvent selected from the group consisting of n-butane, propane and mixtures thereof.

2. A process according to claim 1, wherein the elastomer is a rubber-like terpolymer of ethylene, an α-olefin, and a dienic hydrocarbon.

3. A process according to claim 2, wherein the terpolymer is an ethylene/propylene/5-ethylidene-norbornene-2 terpolymer.

References Cited
UNITED STATES PATENTS

| | | | |
|---|---|---|---|
| 3,642,950 | 2/1972 | O'Shea | 260—878 R |
| 3,683,050 | 8/1972 | Meredith et al. | 260—878 R |
| 3,676,528 | 7/1972 | Severini et al. | 260—878 R |

JOSEPH L. SCHOFER, Primary Examiner

A. HOLLER, Assistant Examiner

PO-1050
(5/69)

UNITED STATES PATENT OFFICE
CERTIFICATE OF CORRECTION

Patent No. 3,849,518                Dated  November 19, 1974

Inventor(s) Febo Severini et al

It is certified that error appears in the above-identified patent and that said Letters Patent are hereby corrected as shown below:

Column 1, line 10:  "32,893/71" should read -- 32,893 A/71 --.

Column 2, line 42:  "reaction" should read -- reactor --; line 67:  "(wherein the" should read -- (wherein the alkyl --.

Column 3, line 11:  "(wherein the group has" should read -- (wherein the alkyl groups have --.

Column 4, line 73:  "37 $\frac{kg \cdot cm}{cm}$" should read -- 37 $\frac{kg \cdot cm}{cm}$ (total breaking of the specimens) --.

Signed and sealed this 4th day of March 1975.

(SEAL)
Attest:

RUTH C. MASON
Attesting Officer

C. MARSHALL DANN
Commissioner of Patents
and Trademarks